(12) United States Patent
Zander et al.

(10) Patent No.: US 6,250,079 B1
(45) Date of Patent: Jun. 26, 2001

(54) TURBO-CHARGED INTERNAL COMBUSTION ENGINE

(75) Inventors: Lennarth Zander, Goteborg; Ingemar Martinsson, Hisings Backa; Kent Giselmo, Vellinge, all of (SE)

(73) Assignee: AB Volvo, Goteborg (SE)

( * ) Notice: Subject to any disclaimer, the term of this patent is extended or adjusted under 35 U.S.C. 154(b) by 0 days.

(21) Appl. No.: 09/529,173

(22) PCT Filed: Oct. 5, 1998

(86) PCT No.: PCT/SE98/01793

§ 371 Date: Jun. 14, 2000

§ 102(e) Date: Jun. 14, 2000

(87) PCT Pub. No.: WO99/19613

PCT Pub. Date: Apr. 22, 1999

(30) Foreign Application Priority Data

Oct. 9, 1997 (SE) .................................................... 9703679

(51) Int. Cl.[7] .................................................... F02D 23/00
(52) U.S. Cl. .................................................... 60/602
(58) Field of Search ....................................... 60/600, 602

(56) References Cited

U.S. PATENT DOCUMENTS

| | | | |
|---|---|---|---|
| 4,406,126 | * | 9/1983 | Yokokura et al. ............... 60/602 X |
| 4,436,172 | * | 3/1984 | Inoue et al. ...................... 60/602 X |
| 4,443,153 | | 4/1984 | Dibelius . |
| 4,530,640 | | 7/1985 | MacInnes . |
| 4,611,465 | | 9/1986 | Kato et al. . |
| 5,673,559 | | 10/1997 | Benson . |

FOREIGN PATENT DOCUMENTS

| | | |
|---|---|---|
| 36 29 841 | 5/1987 | (DE) . |
| 43 42 572 | 11/1994 | (DE) . |
| 2 038 940 | 7/1980 | (GB) . |

* cited by examiner

*Primary Examiner*—Hoang Nguyen
(74) *Attorney, Agent, or Firm*—Young & Thompson

(57) ABSTRACT

A turbo-charged internal combustion engine with a twin-entry exhaust turbine and with a valve arrangement (20) disposed in the turbine housing (11). By means of the valve arrangement (20) the exhaust channels (9, 10) in the turbine housing can be short-circuited. The valve arrangement also functions as a waste-gate valve by virtue of the fact that its valve element (26), in one position, permits exhaust to by-pass the turbine housing through a shunt (18).

8 Claims, 2 Drawing Sheets

TURBO-CHARGED INTERNAL COMBUSTION ENGINE

Figure 1:
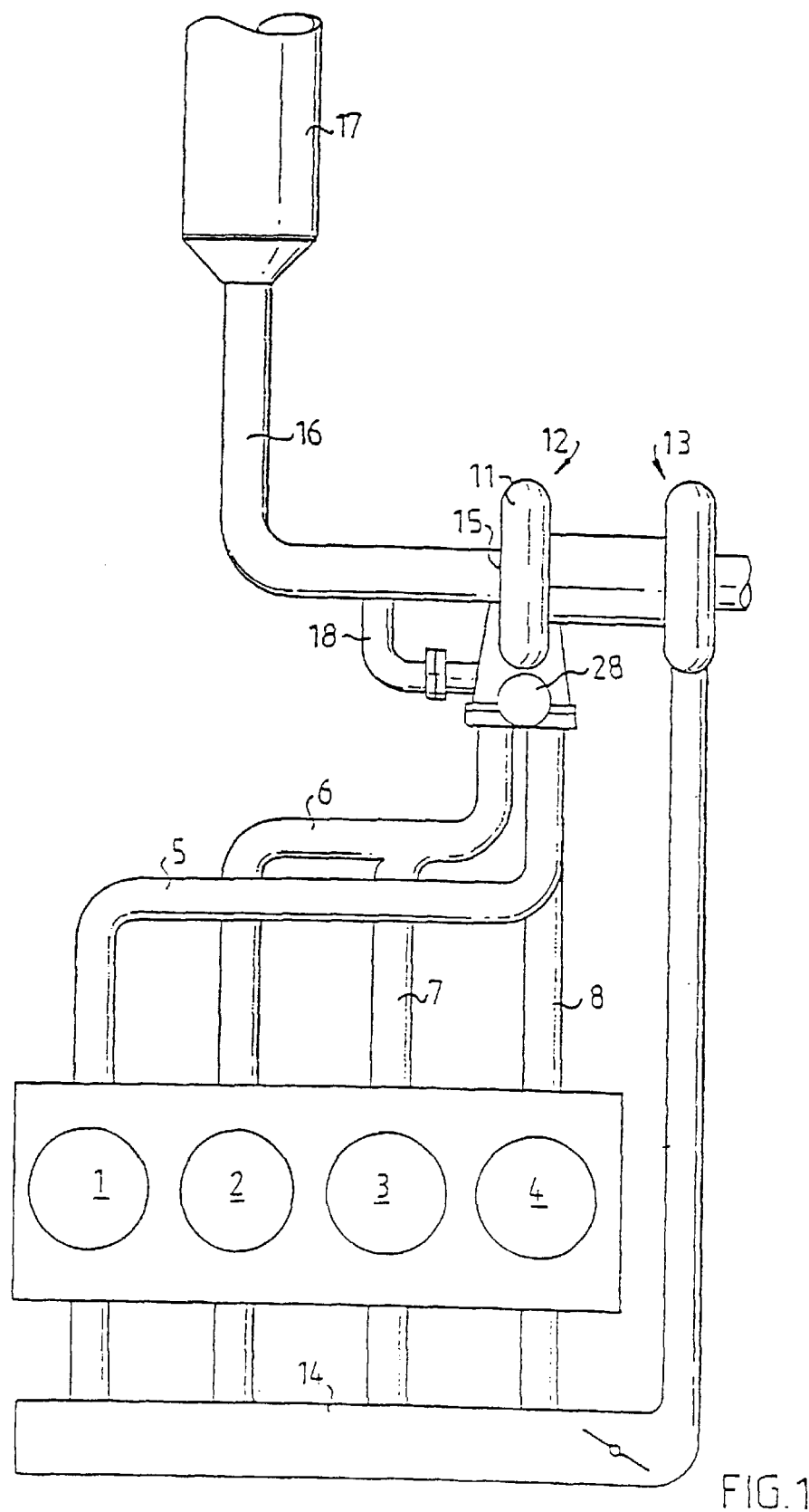

The present invention relates to turbo-charged internal combustion engine with at least four cylinders and an exhaust manifold having an exhaust conduit from each cylinder, the exhaust conduits being combined into two groups, each of said groups opening into an individual inlet to one of two separate channels, each of said channels opening into a turbine housing.

The technology of collecting the exhaust conduits in a multi-cylinder turbo engine into two groups and maintaining the exhaust flow separation between the two groups up to the turbine rotor has been utilized in turbo-charged diesel engines for quite some time and, lately, has also been applied in four-cylinder tubo-charged gasoline engines, using twin-entry type exhaust turbines having a turbine housing with a separate inlet for each of two separate channels into the turbine housing chamber in which the turbine rotor rotates.

By combining the exhaust conduits from the first and fourth cylinders and from the second and third cylinders, respectively, the exhaust side of the engine is divided into two cylinder groups, which provides optimum gas exchange. This separation has the result that shortcircuiting compression waves on the exhaust side cannot disturb the gas exchange, since cylinders connected to the same turbine inlet lie 360 crankshaft degrees from each other. A normal exhaust cam in a number of four-cylinder gasoline engines available on the market has a cam profile which keeps the exhaust valve open for 240 crankshaft degrees and therefore the pressure wave from one cylinder cannot reach the adjacent cylinder. Another advantage and a result thereof is that the pressure wave can only go through the turbine. This results in higher available turbine power at lower r.p.m and thus also to higher charge pressure and higher engine torque at low r.p.m. than when using a common single-entry turbine.

This separation has, however, proved to result in decreased performance at high r.p.m. The pressure ratio over a twin-entry turbine varies more than over a single-entry turbine during one engine work cycle. The pressure ratio and the velocity at which the exhaust jet strikes the turbine rotor are mathematically related and if one increases, then the other increases as well. The ratio between the peripheral velocity of the turbine rotor and the velocity of the exhaust jet determines the turbine efficiency, and if the pressure ratio varies too much, then the efficiency curve will also vary greatly, thus reducing the mean efficiency. The exhaust counter-pressure will when increase for a given charge pressure and the extractable power will decrease, since the pump work increases. The higher pressures which the separation provides during the exhaust phase also contribute to increasing the pump work.

The purpose of the present invention is to achieve a turbo-charged internal combustion engine of the type described by way of introduction which has the good low r.p.m. properties of the twin-entry turbine engine but lacks its disadvantageous high r.p.m. properties.

This is achieved according to the invention by virtue of the fact that the channels are provided with a valve arrangement, comprising a valve element, which can be set in a first position, in which the exhaust flows from the two conduit groups are each led separately into the interior of its turbine housing, and a second position, in which the exhaust flows from the two conduit groups are permitted to mix with each other prior to entry into the interior of the turbine housing.

In the second position, the separation of the exhaust flow into two separate flows is broken by a shortcircuit between the channels in the interior of the turbine housing, so that a single mixed exhaust jet from the two manifold groups strikes the turbine rotor. By shortcircuiting at high r.p.m., the poor high r.p.m. properties of the twin-entry turbine are eliminated and the engine will then work at high r.p.m. as a single-entry turbine engine.

In a further development of the engine according to the invention, the valve arrangement has an outlet to a shunt opening into an exhaust conduit on the downstream side of the turbine housing, and the valve element can be set to a third position, in which the exhausts from the two exhaust conduits can flow through the shunt to the exhaust conduit on the downstream side of the turbine housing by-passing the turbine housing. This provides a valve arrangement which is both a shortcircuit valve and a waste-gate valve.

Figure 2:
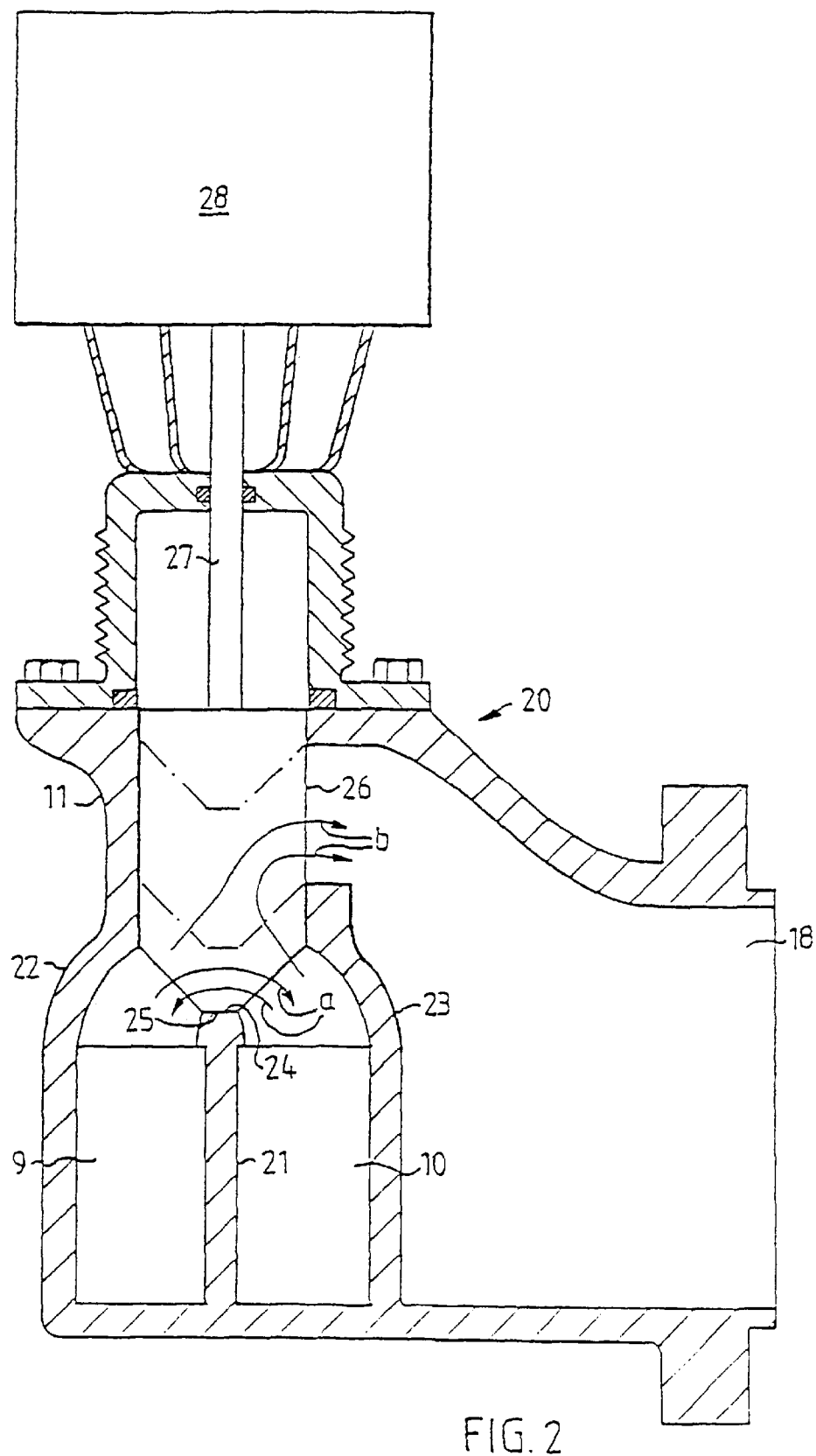

The invention will be described in more detail below with reference to examples shown in the accompanying drawings, where FIG. 1 shows schematically an engine according to the invention and FIG. 2 is a cross-section through one embodiment of a combined shortcircuiting waste-gate valve.

The engine shown in FIG. 1, which can be an Otto engine or a Diesel engine, has four cylinders 1, 2, 3 and 4, the exhaust from which flows into four exhaust conduits 5, 6, 7 and 8, of which conduits 5 and 8 and 6 and 7, respectively, are combined in pairs. The conduit pairs 5, 8 and 6, 7, respectively, each lead to an individual inlet channel 9, 10 (see FIG. 2) into the interior of the turbine housing 11 of a turbo-compressor, which has a turbine 1 of twin-entry type, which drives a compressor 13, which pumps intake air into the engine intake manifold 14. The turbine housing 11 has an outlet 15, which is connected to an exhaust conduit 16 leading to a catalytic converter 17. A shunt 18 is arranged between the inlet side of the turbine housing 11 and the exhaust conduit 16 on the outlet side of the turbine housing. The exhaust flow through the shunt 18 is regulated by a valve means 20 in the turbine housing 11, as shown in more detail in FIG. 2.

As can be seen in FIG. 2, the inlet to the turbine housing 11 is divided by a separating wall 21, so that two channels 9, 10 are formed, which open into a chamber with a turbine rotor (not shown). Over a portion of its length, the dividing wall 21 is lower than the side walls 22, 23 of the channels 9, 10, and its upper surface 24 forms a seat for the end surface 25 of a valve slide 26, as shown with the solid lines in FIG. 2. The extent of the valve slide in the longitudinal direction of the channels 9, 10 corresponds to the length of the lower portion of the dividing wall, and this means that the valve slide, in the position shown with solid lines in FIG. 2, separates the channels from each other, so that the turbine rotor will be struck by two separate exhaust jets. The turbine functions in this position as a twin-entry turbine. The valve slide 26 is connected via a valve spindle 27 to a pneumatically, hydraulically or electromagnetically operated actuator 28, which is preferably controlled via the engine's microprocessor-based control electronics (not shown), which are known per se.

The valve slide 26 is displaceable with the aid of the actuator 28 from the position shown with solid lines to a lower position shown with dash-dot lines, in which exhausts in the two channels 9, 10 can be mixed with each other prior to the inlet into the turbine rotor chamber, as indicated by the arrows "a". In this position, the turbine functions as a single-entry turbine. The valve slide 26 can be adjusted to a third position, which is shown with the upper dash-dot lines, wherein exhausts from the channels 9, 10 can flow out through the shunt 18 to the downstream side of the turbine, as indicated by the arrows "b". In this position, the valve arrangement functions as a waste-gate valve, which is activated by the engine-control electronics when a maximum charge pressure has been reached.

By integrating the new shortcircuiting function and the conventional shunt function in a single valve, the cost for the shortcircuiting fiction is limited. Furthermore, the need for extra space for an additional valve is eliminated.

The invention has been described above with reference to an embodiment in which the channels 9, 10 open into a common turbine housing, i.e. the housing of a twin-entry turbine. In another embodiment, which is not shown here, the channels 9, 10 can, within the scope of the invention, open into individual turbine houses. The engine is in this case a so-called biturbo engine, i.e. it has two separate turbo compressor units. In a biturbo engine with a corresponding valve arrangement 20 between the pairwise combined conduits and the inlets to the respective turbine houses, the same function is achieved as in the described engine with a twin-entry turbine.

What is claimed is:

1. Turbo-charged internal combustion engine with at least four cylinders (1–4) and an exhaust manifold having an exhaust conduit (5–8) from each cylinder, the exhaust conduits being combined into two groups, each of said groups opening into an individual inlet to one of two separate channels (9,10), each of said channels opening into a turbine housing (11), characterized in that the channels (9,10) are provided with a valve arrangement (20), comprising a valve element (26), which can be set in a first position, in which the exhaust flows from the two conduit groups are each led separately into the interior of its turbine housing, and a second position, in which the exhaust flows from the two conduit groups are permitted to mix with each other prior to entry into the interior of the turbine housing.

2. Internal combustion engine according to claim 1, characterized in that the conduits (9,10) open into the interior of two mutually separate turbine houses.

3. Internal combustion engine according to claim 1, characterized in that the channels (9,10) open into the interior of a common turbine housing (11).

4. Internal combustion engine according to claim 3, characterized in that the valve arrangement (20) has an outlet to a shunt (18), which opens into an exhaust conduit (16) on the downstream side of the turbine housing (11), and that the valve element (26) can be set at a third position in which exhaust from the two exhaust conduit groups (5,8 and 6,7, respectively) can flow through the shunt to the downstream side of the exhaust conduit of the turbine housing without passing through the turbine housing.

5. Internal combustion engine according to claim 4, characterized in that the valve arrangement (20) is a slide valve with a linearly displaceable valve slide (26), which is joined to an operating rod (27) displaceable by an actuator (28).

6. Internal combustion engine according to claim 3, characterized in that it has four cylinders (1–4), and that the exhaust conduits from the first (1) and fourth (4) cylinders open into one channel (9) of the turbine housing, and that the exhaust conduits (6,7) of the second (2) and third (3) cylinders open into the second channel (10) of the turbine housing.

7. Internal combustion engine according to claim 4, characterized in that it has four cylinders (1–4), and that the exhaust conduits from the first (1) and and fourth (4) cylinders open into one channel (9) of the turbine housing, and that the exhaust conduits (6, 7) of the second (2) and third (3) cylinders open into the second channel (10) of the turbine housing.

8. Internal combustion engine according to claim 5, characterized in that it has four cylinders (1–4), and that the exhaust conduits from the first (1) and fourth (4) cylinders open into one channel (9) of the turbine housing, and that the exhaust conduits (6, 7) of the second (2) and third (3) cylinders open into the second channel (10) of the turbine housing.

* * * * *